United States Patent
Sakamoto et al.

(10) Patent No.: US 10,425,400 B2
(45) Date of Patent: Sep. 24, 2019

(54) INFORMATION PROCESSING APPARATUS, NON-TRANSITORY COMPUTER-READABLE STORAGE MEDIUM, AND INFORMATION PROCESSING METHOD

(71) Applicant: FUJITSU LIMITED, Kawasaki-shi, Kanagawa (JP)

(72) Inventors: Takuya Sakamoto, Kawasaki (JP); Koichi Yasaki, Kawasaki (JP); Kazuaki Nimura, Kawasaki (JP); Hidenobu Ito, Kawasaki (JP); Yosuke Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 15/650,389

(22) Filed: Jul. 14, 2017

(65) Prior Publication Data
US 2018/0054435 A1 Feb. 22, 2018

(30) Foreign Application Priority Data

Aug. 17, 2016 (JP) ................. 2016-160245

(51) Int. Cl.
*H04L 29/06* (2006.01)
*H04L 9/32* (2006.01)
(Continued)

(52) U.S. Cl.
CPC ........ *H04L 63/0823* (2013.01); *H04L 9/3231* (2013.01); *H04L 9/3247* (2013.01);
(Continued)

(58) Field of Classification Search
CPC .................................................. H04L 63/0823
See application file for complete search history.

(56) References Cited

U.S. PATENT DOCUMENTS 8,407,773 B1 * 3/2013 Hayter ............... H04L 67/16
726/7
9,154,949 B1 * 10/2015 Bertz ............... H04W 12/06
(Continued)

FOREIGN PATENT DOCUMENTS

AU 2012315866 4/2013
JP 2011-232794 11/2011
(Continued)

OTHER PUBLICATIONS

Extended European Search Report of European Patent Application No. 17179670.9 dated Dec. 14, 2017.
(Continued)

*Primary Examiner* — Simon P Kanaan
(74) *Attorney, Agent, or Firm* — Fujitsu Patent Center

(57) ABSTRACT

An information processing apparatus stores information concerning a communication path for authentication between a first apparatus and a second apparatus that provides a service, in response to a service access request from the first apparatus; transmits the service access request to the second apparatus by using the information concerning the communication path for authentication; transfers, in response to an authentication request from the second apparatus, the authentication request to the first apparatus by using the information concerning the communication path for authentication; transfers, in response to a response including authentication information from the first apparatus, the response including the authentication information to the second apparatus by using the information concerning the communication path for authentication; and receives data of the service provided by the second apparatus and output a content based on the received content.

9 Claims, 9 Drawing Sheets

(51) Int. Cl.
*H04W 12/06* (2009.01)
*G06F 21/31* (2013.01)

(52) U.S. Cl.
CPC ...... *H04L 9/3263* (2013.01); *H04L 29/06775* (2013.01); *H04L 63/0861* (2013.01); *H04L 63/0884* (2013.01); *H04W 12/06* (2013.01); *G06F 21/31* (2013.01); *H04L 63/08* (2013.01); *H04L 63/0853* (2013.01); *H04L 63/108* (2013.01)

(56) References Cited

U.S. PATENT DOCUMENTS

| | | | | |
|---|---|---|---|---|
| 2002/0049914 | A1* | 4/2002 | Inoue | G06F 21/31 726/6 |
| 2004/0030935 | A1* | 2/2004 | Kai | G06F 21/43 726/5 |
| 2008/0056501 | A1* | 3/2008 | McGough | H04L 63/062 380/281 |
| 2008/0220799 | A1* | 9/2008 | Tsai | H04B 7/2606 455/509 |
| 2010/0071033 | A1 | 3/2010 | Umezawa et al. | |
| 2011/0264910 | A1 | 10/2011 | Masuda | |
| 2011/0277020 | A1 | 11/2011 | Morita et al. | |
| 2014/0351589 | A1 | 11/2014 | Chenna | |

FOREIGN PATENT DOCUMENTS

| | | |
|---|---|---|
| WO | 2009/028606 | 3/2009 |
| WO | 2011/074500 | 6/2011 |

OTHER PUBLICATIONS

EPOA—European Office Action dated Apr. 11, 2019 for corresponding European Patent Application No. 17179670.9.

* cited by examiner

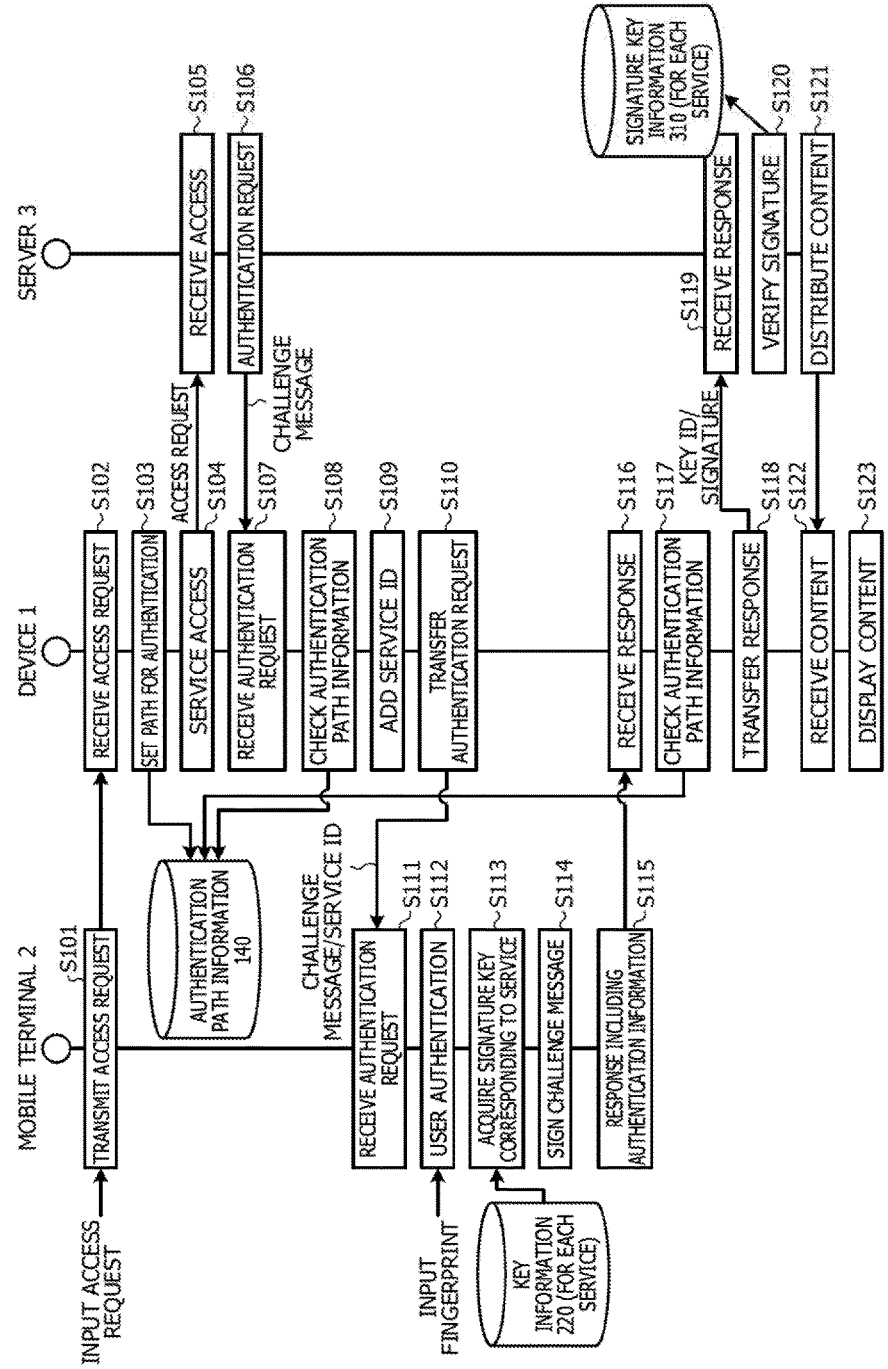

INFORMATION PROCESSING APPARATUS, NON-TRANSITORY COMPUTER-READABLE STORAGE MEDIUM, AND INFORMATION PROCESSING METHOD

CROSS-REFERENCE TO RELATED APPLICATION

This application is based upon and claims the benefit of priority of the prior Japanese Patent Application No. 2016-160245, filed on Aug. 17, 2016, the entire contents of which are incorporated herein by reference.

FIELD

The embodiment discussed herein is related to an information processing apparatus, a non-transitory computer-readable storage medium, an information processing method, and an information processing system.

BACKGROUND

The advances in "Internet of Things (IoT)" technology have recently allowed various objects (things) to be connected to the Internet and to enable utilization of services via the Internet by cooperating with the cloud. Services become utilizable after a setting is made in devices, which are things, belonging to respective users or groups to cooperate with a personal computer (PC) or a mobile terminal.

For example, users utilize services by using their mobile terminals. In such cases, users sometimes utilize services from their mobile terminals via a device. Users are allowed to utilize services customized for them once they are authenticated by the device.

An account identifier (ID) and a password are sometimes used in user authentication performed in such cases. For example, the user inputs their account ID and password into a device. The device that has received the input account ID and password performs user authentication for a service in accordance with the input account ID and the password.

There is a technique that allows a device to request another terminal to perform user authentication in place of the device. According to such a technique, an authentication terminal loads authentication data used to perform personal authentication in response to a proxy authentication request from a device, transmits an authentication request to an authentication server together with the loaded authentication data, receives an authentication result from the authentication server, and notifies the device of the result.

Examples of the related art include International Publication Pamphlet No. WO 2009/028606, Japanese Laid-open Patent Publication No. 2011-232794, and International Publication Pamphlet No. WO 2011/074500.

SUMMARY

According to an aspect of the invention, an information processing apparatus includes: a memory; and a processor coupled to the memory and configured to execute a setting process that includes storing, in the memory, information concerning a communication path for authentication between a first apparatus and a second apparatus that provides a service, in response to a service access request from the first apparatus, execute a transmission process that includes transmitting the service access request to the second apparatus by using the information concerning the communication path for authentication, execute a first transfer process that includes transferring, in response to an authentication request from the second apparatus, the authentication request to the first apparatus by using the information concerning the communication path for authentication, execute a second transfer process that includes transferring, in response to a response including authentication information from the first apparatus, the response including the authentication information to the second apparatus by using the information concerning the communication path for authentication, and execute a reception process that includes receiving data of the service provided by the second apparatus and outputting a content based on the received data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a sequence performed by the information processing system according to the embodiment;

DESCRIPTION OF EMBODIMENTS

In the case where a setting has not been made in a device to cooperate with a mobile terminal, a user of the mobile terminal sometimes desires to utilize a service provided via the device by temporarily utilizing the device from the mobile terminal. In such a case, it is difficult to implement secure and low-cost user authentication to utilize the service via the temporarily utilized device.

In existing user authentication that uses an account ID and a password, a device performs user authentication for a service in accordance with an account ID and a password received from a user. However, this user authentication may involve potential misuse and leakage of authentication information because authentication information, such as an account ID and a password, is stored in the device. Storage of authentication information in the device may hinder implementation of secure user authentication to utilize a service via a temporarily utilized device. For example, in the case where a user temporarily utilizes a device managed by another person, the user may be very concerned about inputting their authentication information into the device.

In accordance with the existing technique that allows a device to request another terminal to perform user authentication in place of the device, on the other hand, authentication information is not stored in the device, but a mechanism for performing user authentication in place of the device is provided on the authentication server or in the authentication terminal. Accordingly, it is difficult to implement low-cost user authentication to utilize a service via a temporarily utilized device.

As one aspect of the present embodiment, provided are techniques for implementing secure and low-cost user authentication performed when a service is utilized via a device.

An embodiment of an information processing apparatus, a recording medium storing an information processing program, an information processing method, and an information processing system disclosed by this application will be described in detail below with reference to the accompanying drawings. Note that the present disclosure is not limited to the embodiment.

Figure 1:
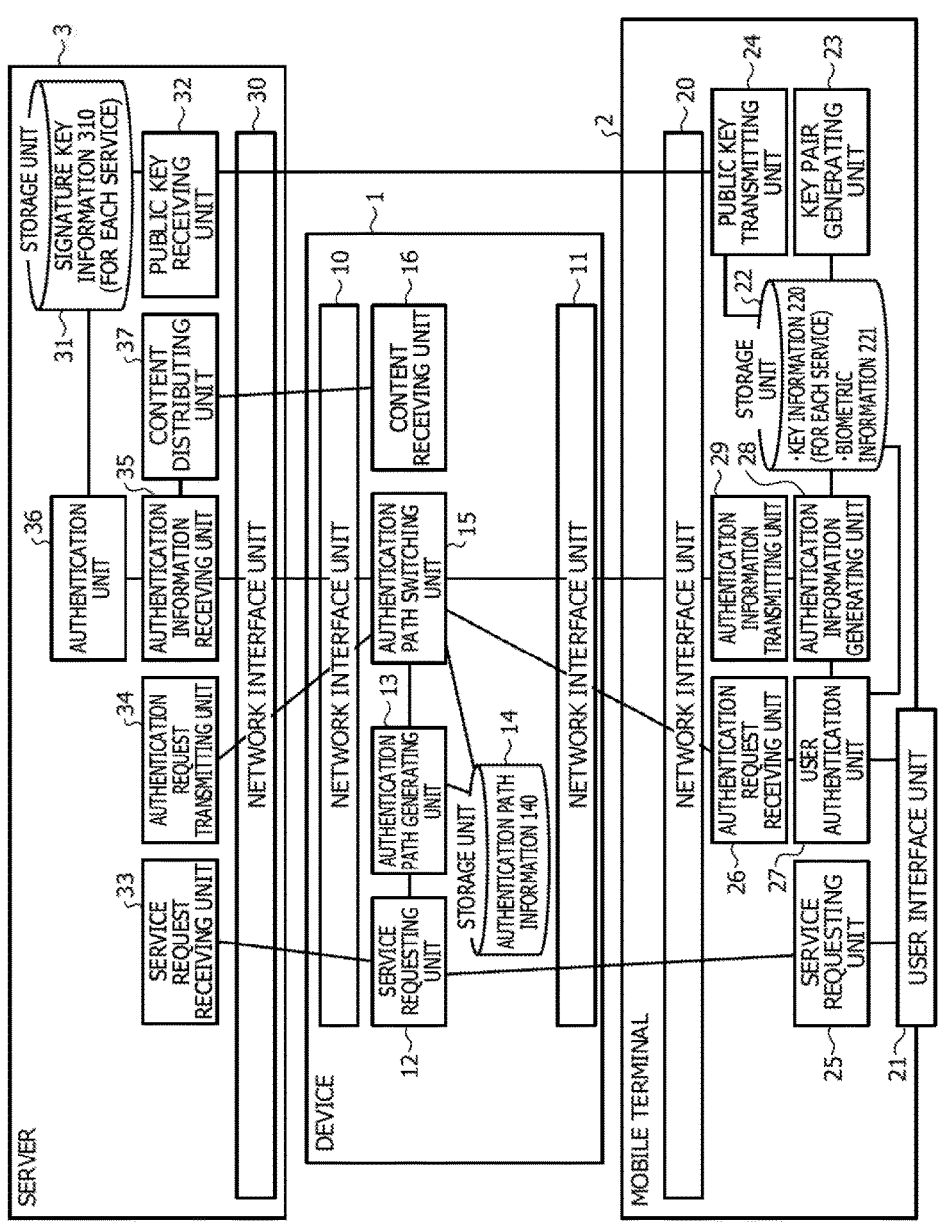
FIG. 1 is a block diagram illustrating the functional configuration of an information processing system according to an embodiment.

FIG. 1 is a block diagram illustrating the functional configuration of an information processing system including a device according to an embodiment. As illustrated in FIG. 1, an information processing system 9 includes a device 1, a mobile terminal 2, and a server 3. The device 1 is an example of an information processing apparatus. The mobile terminal 2 is an example of a first apparatus and an example of a mobile communication apparatus. The server 3 is an example of a second apparatus and an example of a server apparatus.

The mobile terminal 2 is a portable terminal used by a user and having a communication function. The mobile terminal 2 is, but not limited to, a smartphone, for example. Alternatively, the mobile terminal 2 may be a wearable terminal or an authentication terminal used to perform user authentication.

The device 1 is a temporarily utilized device in which a setting for cooperating with the mobile terminal 2 is not made. The device 1 allows the user to use an app, allows the user to view and listen to content, and allows access to the function thereof from a service provided by the server 3. For example, a web browser is installed in the device 1, and the device 1 is capable of displaying a webpage by accessing the server 3 in accordance with a specified Uniform Resource Locator (URL). In addition, an app of a music or video player is installed in the device 1, and the device 1 is capable of acquiring content from the server 3 and allows the user to view and listen to the acquired content. Further, the device 1 is equipped with an accelerator sensor or a Global Positioning System (GPS) function and is capable of outputting a response in response to a request from a service provided by the server 3. An example of the device 1 includes an automobile connected to a network (so-called connected car), a car navigation system installed in an automobile, or a digital signage placed at a shopping mall.

The server 3 provides one or a plurality of services. The services can be accessed via a network. The Internet is an example of such a network.

The device 1 is connected to the mobile terminal 2 and to the server 3. The mobile terminal 2 is connected to the device 1 and to the server 3. For example, the device 1 and the mobile terminal 2 are connected to the server 3 via a network, such as a mobile phone network or a network based on Wi-Fi (registered trademark). For example, the device 1 is connected to the mobile terminal 2 via a network, such as a network based Bluetooth (registered trademark), Bluetooth Low Energy (BLE), or Wi-Fi. In the case where the device 1 and the mobile terminal 2 are connectable to each other by using BLE, they are connected by using the BLE function. In an example, the device 1 sends a packet called advertisement. The mobile terminal 2 detects the sent advertisement and performs a connection process. In another example, the mobile terminal 2 sends a packet called advertisement. The device 1 detects the sent advertisement and performs a connection process.

In the information processing system 9, when a service involving user authentication is utilized, the device 1 transfers communication for authentication to the mobile terminal 2 and acts as if the device 1 had an authentication function. That is, a service involving user authentication is utilized without configuring the device 1 to have an authentication function.

The device 1 includes network interface units 10 and 11, a service requesting unit 12, an authentication path generating unit 13, a storage unit 14, an authentication path switching unit 15, and a content receiving unit 16.

The network interface unit 10 is a network interface used when the device 1 communicates with the server 3. The network interface unit 11 is a network interface used when the device 1 communicates with the mobile terminal 2. The network interface units 10 and 11 are configured as two interfaces; however, the configuration is not limited to this one, and the network interface units 10 and 11 may be configured as a single interface.

The service requesting unit 12 causes the authentication path generating unit 13 (described alter) to generate an authentication path for authentication in response to receipt of an access request for a service from the mobile terminal 2. The service requesting unit 12 also transmits, by using the generated authentication path, the access request for the service to the server 3 corresponding to the service. For example, the service requesting unit 12 transmits an access request for a service to a URL of the service by using the Hypertext Transfer Protocol (HTTP).

The authentication path generating unit 13 generates an authentication path. For example, the authentication path generating unit 13 generates, for each service for which an access request is made, an authentication path indicating a communication path between the mobile terminal 2 and the server 3 that are connected to each other for authentication. The authentication path generating unit 13 stores the authentication path generated for each service in the storage unit 14 as authentication path information 140. That is, the authentication path generating unit 13 generates an authentication path in order to transfer information received from the server 3 to the mobile terminal 2.

The storage unit 14 is, for example, a semiconductor memory element, such as a random access memory (RAM) or a flash memory; or a storage device, such as a hard disk or an optical disc. The storage unit 14 includes the authentication path information 140.

Figure 2:
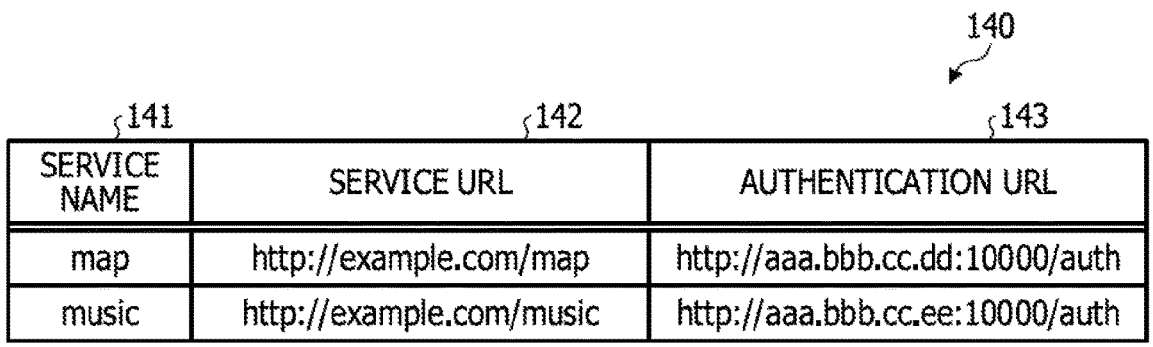
FIG. 2 is a diagram illustrating an example of the data structure of authentication path information according to the embodiment.

The data structure of the authentication path information 140 will be described with reference to FIG. 2. FIG. 2 is a diagram illustrating an example of the data structure of the authentication path information 140 according to the embodiment. As illustrated in FIG. 2, the authentication path information 140 stores a service name 141, a service URL 142, and an authentication URL 143 in association with one another. The service name 141 indicates the name of a service. The service URL 142 indicates a URL of the service. The authentication URL 143 indicates a URL of an authentication destination that performs authentication. Note that the description is given on the assumption that the service URL 142 and the authentication URL 143 indicate URLs; however, the configuration is not limited this one, and the service URL 142 and the authentication URL 143 may indicate addresses that conform to the communication standard.

In an example case where the service name 141 indicates "map", the storage unit 14 stores "http://example.com/map" as the service URL 142 and "http://aaa.bbb.cc.dd:10000/auth" as the authentication URL 143. In the case where the service name 141 indicates "music", the storage unit 14 stores "http://example.com/music" as the service URL 142 and "http://aaa.bbb.cc.ee:10000/auth" as the authentication URL 143. For example, suppose that the service requesting unit 12 receives an access request for a service assigned the URL "http://example.com/map" from the mobile terminal 2 assigned the URL "http://aaa.bbb.cc.dd:10000/auth". In this case, the authentication path generating unit 13 stores "map", "http://example.com/map", and "http://aaa.bbb.cc.dd:1000/auth" respectively as the service name 141, the service URL 142, and the authentication URL 143 in the authentication path information 140 in association with one another.

Referring back to FIG. 1, in response to receipt of an authentication request (challenge message) from a service of the server 3, the authentication path switching unit 15 switches the transfer destination of the authentication request from the device 1 to the mobile terminal 2 serving as the authentication destination by using the authentication path information 140. For example, the authentication path switching unit 15 switches the transfer destination of the authentication request to the authentication URL 143 associated with the URL of the service by using the authentication path information 140. The authentication path switching unit 15 transfers the authentication request and the service identifier (ID) to the mobile terminal 2 indicated by the authentication URL 143 set by the switching. For example, suppose that the device 1 and the server 3 are connected to each other by using Wi-Fi and the device 1 and the mobile terminal 2 are connected to each other by using BLE. In such a case, the authentication path switching unit 15 converts data received by using Wi-Fi into data of the BLE format and transfers the resultant data to the mobile terminal 2. The service ID may be an ID associated with the service in advance or may be the service URL 142. The following description is given on the assumption that the service ID is the service URL 142.

Authentication request methods include a method in which an authentication request (challenge message) is contained in the header of an access-related packet when basic access authentication is performed over an HTTP-based access. In the case where such a method is used, in response to receipt of a packet from a service of the server 3, the authentication path switching unit 15 checks the header of the received packet. In this way, the authentication path switching unit 15 successfully determines whether the received packet is an authentication request. Another authentication request method is a method in which an application programming interface (API) for an authentication request, which is embedded in a webpage displayed by a web browser, is called. In the case where such a method is used, the authentication path switching unit 15 receives an authentication request when an API for an authentication request is called in the webpage.

In response to receipt of a response for the authentication request from the mobile terminal 2, the authentication path switching unit 15 switches, by using the authentication path information 140, the transfer destination of the response for the authentication request from the device 1 to the service that has made the authentication request. For example, the authentication path switching unit 15 switches the transfer destination of the response for the authentication request to the service URL 142 associated with the URL of the mobile terminal 2, which is the authentication destination, by using the authentication path information 140. The authentication path switching unit 15 also transfers the response for the authentication request to the server 3 corresponding to the service indicated by the service URL 142 set by the switching.

In response to receipt of data provided by the service of the server 3, the content receiving unit 16 displays the received data. The data is data corresponding to the service, for example, web content or content such as music or images. The data may be a web access to the device 1. The term "web access" used herein refers to accessing the device 1 from the server 3 by using, for example, HTTP-GET or HTTP-POST as a control command.

The mobile terminal 2 includes a network interface unit 20, a user interface unit 21, a storage unit 22, a key pair generating unit 23, a public key transmitting unit 24, a service requesting unit 25, an authentication request receiving unit 26, a user authentication unit 27, an authentication information generating unit 28, and an authentication information transmitting unit 29.

The network interface unit 20 is a network interface used when the mobile terminal 2 communicates with the device 1 and the server 3. The user interface unit 21 is a man-machine interface for the user. Examples of the user interface unit 21 include a keyboard, a mouse, and a touch panel.

The storage unit 22 is, for example, a semiconductor memory element, such as a RAM or a flash memory; or a storage device, such as a hard disk or an optical disc. The storage unit 22 includes key information 220 and biometric information 221.

The key information 220 is information concerning keys for use in authentication. It is assumed that authentication is performed by using the Fast Identity Online (FIDO) Alliance technology herein. The key information 220 stores, for each service, a pair of a public key and a secret key of public key cryptography and a corresponding key ID in association with each other. Note that the key information 220 is generated and registered by the key pair generating unit 23 (described later) before authentication is performed.

The biometric information 221 is biometric information of each user for use in authentication. Examples of biometric information of each user include fingerprint information and iris information. The biometric information 221 is registered in the storage unit 22 in advance. The following description will be given on the assumption that the biometric information 221 is fingerprint information.

The key pair generating unit 23 generates, for each service, a pair of a public key and a secret key and a corresponding key ID in accordance with the public key cryptography. The key pair generating unit 23 stores the pair of the public key and the secret key and the corresponding key ID that are generated for each service in the storage unit 22 as the key information 220. Note that the processing performed by the key pair generating unit 23 is a procedure that enables authentication between a service of the server 3 and the mobile terminal 2 and is performed prior to authentication.

The public key transmitting unit 24 transmits the public key of the key pair generated by the key pair generating unit 23 to the server 3 that provides the corresponding service. Note that the processing performed by the public key transmitting unit 24 is a procedure that enables authentication between a service of the server 3 and the mobile terminal 2 and is performed prior to authentication.

The service requesting unit 25 transmits an access request for a service to the device 1. An access request may be made for a single service or for a plurality of services. Note that the processing is performed by the service requesting unit 25 after a connection is established between the mobile terminal 2 and the device 1.

The authentication request receiving unit 26 receives an authentication request (challenge message) and a service ID from the device 1.

The user authentication unit 27 performs user authentication. For example, in response to the authentication request receiving unit 26 receiving an authentication request, the user authentication unit 27 displays an authentication screen that prompts authentication on a monitor via the user interface unit 21. In response to receipt of fingerprint information from a fingerprint sensor installed in the mobile terminal 2, the user authentication unit 27 compares the received fingerprint information with the biometric information 221 registered in advance to perform user authentication. When the received fingerprint information matches the biometric information 221, the user authentication unit 27 displays a message indicating that user authentication is successful in the authentication screen. When the received fingerprint information does not match the biometric information 221, the user authentication unit 27 displays a message indicating that user authentication is unsuccessful in the authentication screen.

The authentication information generating unit 28 generates authentication information of the user when authentication of the user performed by the user authentication unit 27 is successful. For example, the authentication information generating unit 28 selects the private key from the key information 220 in accordance with the service ID received by the authentication request receiving unit 26 and signs the challenge message contained in the authentication request by using the selected secret key.

The authentication information transmitting unit 29 transmits the authentication information to the device 1. For example, the authentication information transmitting unit 29 selects a key ID from the key information 220 in accordance with the service ID received by the authentication request receiving unit 26. The authentication information transmitting unit 29 transmits authentication information that contains signature information and the selected key ID to the device 1 as a response for the authentication request.

The server 3 includes a network interface unit 30, a storage unit 31, a public key receiving unit 32, a service request receiving unit 33, an authentication request transmitting unit 34, an authentication information receiving unit 35, an authentication unit 36, and a content distributing unit 37.

The network interface unit 30 is a network interface used when the server 3 communicates with the device 1. The network interface unit 30 is a network interface also used when the server 3 communicates with the mobile terminal 2.

The storage unit 31 is, for example, a semiconductor memory element, such as a RAM or a flash memory; or a storage device, such as a hard disk or an optical disc. The storage unit 31 includes signature key information 310.

The signature key information 310 is information concerning a key used in authentication. It is assumed that the authentication method used by the server 3 is the same as that used by the mobile terminal 2 and that authentication is performed using the FIDO alliance technology. The signature key information 310 stores, for each service, a key used for signature and a corresponding key ID in association with each other. The key used for signature is, for example, a public key. Note that the signature key information 310 is registered by the public key receiving unit 32 (described later) prior to authentication.

The public key receiving unit 32 receives a public key corresponding to a service from the mobile terminal 2. The public key receiving unit 32 stores the received public key (key used for signature) and the service in association with each other in the storage unit 31 as the signature key information 310. Note that the processing of registering the signature key information 310 is a procedure that enables authentication between a service of the server 3 and the mobile terminal 2 and is performed prior to authentication.

The service request receiving unit 33 receives an access request for a service from the device 1.

In response to the service request receiving unit 33 receiving an access request for a service, the authentication request transmitting unit 34 transmits an authentication request (challenge message) for the service to the device 1 as a response. For example, authentication request methods include a method in which an authentication request (challenge message) is contained in the header of an access-related packet when basic access authentication is performed over an HTTP-based access. In the case where such a method is used, the authentication request transmitting unit 34 includes a challenge message in the header of the packet and transmits the resultant packet to the device 1 as a response.

The authentication information receiving unit 35 receives authentication information for a service from the device 1.

The authentication unit 36 verifies the authentication information for the service. For example, the authentication unit 36 extracts a key used for signature, which is registered in advance, from the signature key information 310 in accordance with the key ID included in the authentication information received by the authentication information receiving unit 35 and verifies the signature.

When authentication performed by the authentication unit 36 for a service is successful, the content distributing unit 37 distributes content corresponding to the service to the device 1 as a response.

Figure 3:
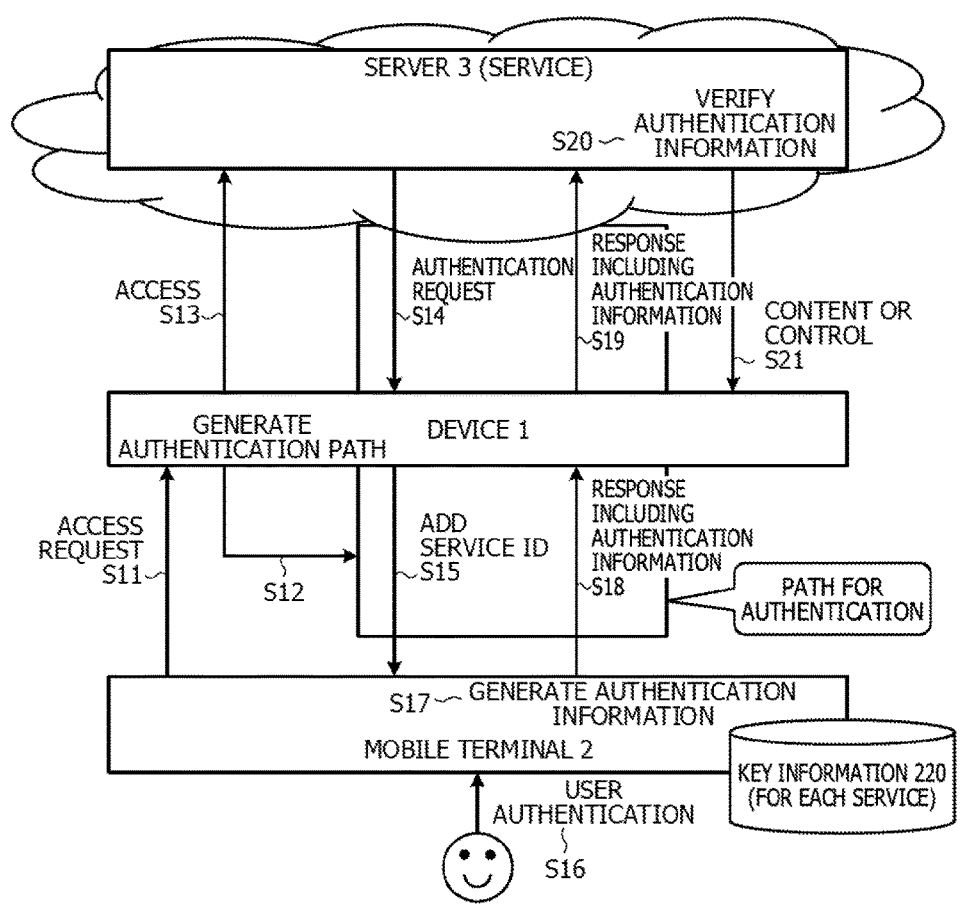
FIG. 3 is a diagram illustrating an example of the flow of an information processing process according to the embodiment.

FIG. 3 is a diagram illustrating an example of the flow of an information processing process according to the embodiment.

As illustrated in FIG. 3, the service requesting unit 25 of the mobile terminal 2 transmits an access request for a service to the device 1 (S11).

The service requesting unit 12 of the device 1 receives the access request for the service (service access request). Then, the authentication path generating unit 13 generates an authentication path for authentication between the mobile terminal 2 and the server 3 (S12). That is, such a setting process is for making a setting to transfer information received from the server 3 to the mobile terminal 2. The service requesting unit 12 then accesses the server 3 by using the generated authentication path to transmit the access request for the service (S13).

In response to the service request receiving unit 33 of the server 3 receiving the access request for the service, the authentication request transmitting unit 34 transmits an authentication request (challenge message) for the service to the device 1 as a response (S14).

In response to receipt of the authentication request (challenge message) for the service, the authentication path switching unit 15 of the device 1 switches the transfer destination of the authentication request to the mobile terminal 2 by using the authentication path information 140. The authentication path switching unit 15 then transfers the authentication request to the mobile terminal 2 after attaching the corresponding service ID of the service to the authentication request for the service (S15).

The user authentication unit 27 of the mobile terminal 2 performs user authentication (S16). If user authentication is successful, the authentication information generating unit 28 generates authentication information of the user by using the key information 220 (S17). The authentication information transmitting unit 29 then transmits the generated authentication information of the user to the device 1 as a response for the authentication request for the service (S18).

The authentication path switching unit 15 of the device 1 switches the transfer destination of the response for the authentication request for the service to the corresponding service by using the authentication path information 140 and transfers the authentication information of the user to the server 3 corresponding to the service as a response for the authentication request for the service (S19).

The authentication unit 36 of the server 3 verifies the authentication information of the user (S20). If verification of the authentication information is successful, the content distributing unit 37 distributes content corresponding to the service to the device 1 as a response (S21).

FIG. 4 is a diagram illustrating an example of a sequence performed by the information processing system according to the embodiment. As illustrated in FIG. 4, the service requesting unit 25 of the mobile terminal 2 that has received an access request input by the user transmits the access request to the device 1 (S101). Suppose that the user makes a request to access a service "View Map", for example. The service requesting unit 25 transmits {"service":[{"name": "map", "url":"http://example.com/map"}], "auth":"http://aaa.bbb.cc.dd:10000"} to the device 1. Here, "http://example.com/map" is the URL of the service "View Map", and "http://aaa.bbb.cc.dd:10000" is the URL of the authentication destination.

The service requesting unit 12 of the device 1 receives the access request (S102) and causes the authentication path generating unit 13 to set an authentication path (S103). For example, "map", "http://example.com/map", and "http://aaa.bbb.cc.dd:1000/auth" are respectively set as the service name 141, the service URL 142, and the authentication URL 143 in the authentication path information 140. The service requesting unit 12 then transfers the access request to the service URL 142 (S104).

The service request receiving unit 33 of the server 3 receives the access request (S105), and the authentication request transmitting unit 34 transmits an authentication request (challenge message) to the device 1 (S106).

The authentication path switching unit 15 of the device 1 receives the authentication request (challenge message) (S107) and checks the authentication path information 140 (S108). In this case, the authentication path switching unit 15 refers to the authentication path information 140 and acquires the authentication URL 143 corresponding to the service. The authentication path switching unit 15 then attaches the service ID of the service to the authentication request (S109) and transfers the resultant authentication request to the authentication URL 143 (S110). For example, the authentication path switching unit 15 transfers {"serviceID":"http://example.com/map", "ServerChallenge": "xxxxxxxx"} as the authentication request to the mobile terminal 2 assigned "http://aaa.bbb.cc.dd:10000/auth" as the authentication URL 143". Here, "http://example.com/map" is the service ID, and "xxxxxxxx" is the challenge message.

The authentication request receiving unit 26 of the mobile terminal 2 receives the authentication request (S111) and displays an authentication screen that prompts the user to perform authentication. It is assumed that fingerprint authentication is performed as the authentication. Then, the user authentication unit 27 that has received input fingerprint information of the user compares the input fingerprint information with the biometric information 221 to perform user authentication (S112). If user authentication is successful, the authentication information generating unit 28 acquires signature key (secret key) from the key information 220 in accordance with the service ID included in the authentication request (S113) and signs the challenge message by using the acquired secret key (S114). The authentication information transmitting unit 29 then transmits the signature information and the key ID included in the key information 220 to the device 1 as a response for the authentication request (S115).

The authentication path switching unit 15 of the device 1 receives the response for the authentication request (S116) and checks the authentication path information 140 (S117). In this case, the authentication path switching unit 15 refers to the authentication path information 140 and acquires the service URL 142 corresponding to the authentication URL 143. The authentication path switching unit 15 then transfers the response for the authentication request to the acquired service URL 142 (S118). The response for the authentication request includes the signature information and the key ID.

In response to the authentication information receiving unit 35 of the server 3 receiving the response for the authentication request (S119), the authentication unit 36 acquires the key (public key) used for signature from the signature key information 310 in accordance with the key ID included in the response for the authentication information and verifies the signature information by using the acquired public key (S120). If verification of the signature information is successful, the content distributing unit 37 distributes content corresponding to the service (S121).

The content receiving unit 16 of the device 1 receives content (S122) and displays the received content (S123).

With such a configuration, the device 1 enables utilization of a service involving user authentication without being configured to have an authentication function.

In the description, the authentication path switching unit 15 of the device 1 transfers the response for the authentication request to the service URL 142 acquired from the authentication path information 140. The processing performed by the authentication path switching unit 15 is not limited to this one, and the authentication path switching unit 15 may include Set-Cookie (Cookie) information in the header of the response for the authentication request and may attach this Cookie as identification of the user for subsequent accesses to the service from the device 1. With this configuration, the device 1 enables continuous utilization of the service provided by the server 3 while the user is kept in the authenticated state as long as the Cookie is valid.

When the Cookie becomes invalid, the user is no longer in the authenticated state. Thus, the service provided by the server 3 is no longer utilizable via the device 1. Methods for invalidating the Cookie include the following ones. In an example, the device 1 displays a logout button in the screen and deletes the Cookie when this logout button is pressed. In another example, the mobile terminal 2 displays a logout button in the screen and transmits information indicating logout to the device 1 when this logout button is pressed, and the device 1 deletes the Cookie upon receipt of this information. When a logout operation is performed in the device 1, not only the Cookie but also all the distributed content may be deleted.

Figure 5A:
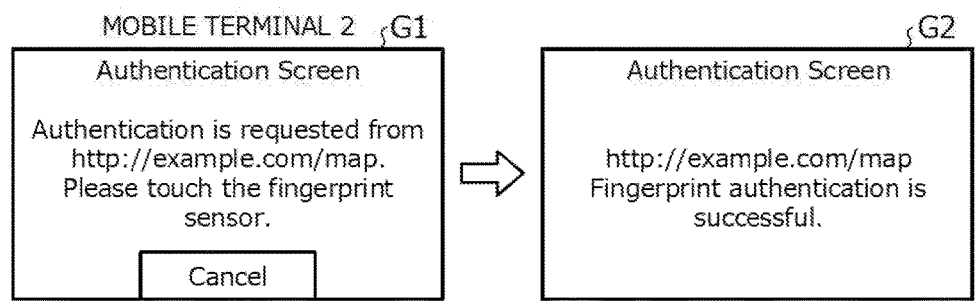
FIGS. 5A and 5B are diagrams each illustrating an example of an authentication screen used in user authentication.

An example of an authentication screen used in user authentication will be described with reference to FIG. 5A. FIG. 5A is a diagram illustrating an example of an authentication screen used in user authentication. It is assumed that FIG. 5A illustrates the case where the user has made a request to access a service "View Map". In response to the authentication request receiving unit 26 of the mobile terminal 2 receiving an authentication request from the service "View Map", an authentication screen G1 used in user authentication is displayed as illustrated in FIG. 5A. FIG. 5A illustrates the authentication screen G1 that is displayed in the case where the user is requested to perform authentication from the URL "http://example.com/map/" of the service "View Map". The user then touches the fingerprint sensor. If user authentication is successful, the user authentication unit 27 displays a message indicating that fingerprint authentication is successful in the authentication screen used in user authentication. In this example, an authentication screen G2 indicating that fingerprint authentication is successful for the service "View Map" is displayed.

Figure 5B:
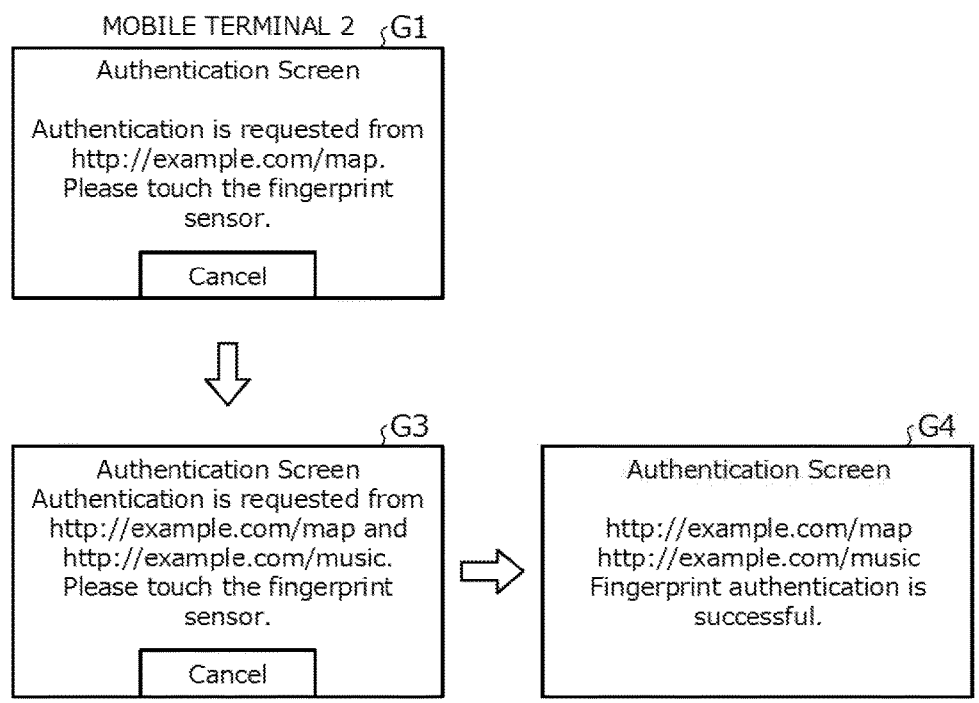

FIG. 5B is a diagram illustrating another example of an authentication screen used in user authentication. It is assumed that FIG. 5B illustrates the case where the user has made a request to access the service "View Map" and a request to access a service "Listen to Music". As illustrated in FIG. 5B, in response to the authentication request receiving unit 26 of the mobile terminal 2 receiving an authentication request from the service "View Map", the authentication screen G1 used in user authentication is displayed. Then, in response to the authentication request receiving unit 26 of the mobile terminal 2 receiving an authentication request from the service "Listen to Music", the authentication request from this service is displayed in the authentication screen G1 used in user authentication that is already displayed. An authentication screen G3 corresponds to this state. FIG. 5B illustrates the authentication screen G3 that is displayed in the case where the user is requested to perform authentication from the URL "http://example.com/map/" of the service "View Map" and the user is also requested to perform authentication from the URL "http://example.com/music" of the service "Listen to Music". The user then touches the fingerprint sensor. If user authentication is successful, the user authentication unit 27 displays a message indicating that fingerprint authentication is successful for the two services in an authentication screen G4 used in user authentication. In this example, the authentication screen G4 indicating that fingerprint authentication is successful for the service "View Map" and the service "Listen to Music" is displayed.

With this configuration, when a plurality of services are simultaneously utilized, the user authentication unit 27 allows the user to perform the authentication operation at a time, so that authentication may be performed collectively for the plurality of services.

In the description of the embodiment, in response to the mobile terminal 2 transmitting an access request for a service to the device 1, the device 1 generates the authentication path information 140 for each service for which the access request is made and stores the generated authentication path information 140 in the storage unit 14. However, the configuration of the embodiment is not limited to this one, and the mobile terminal 2 may register a service for which an access request is to be made in the device 1 in advance before transmitting the access request for the service.

Figure 6:
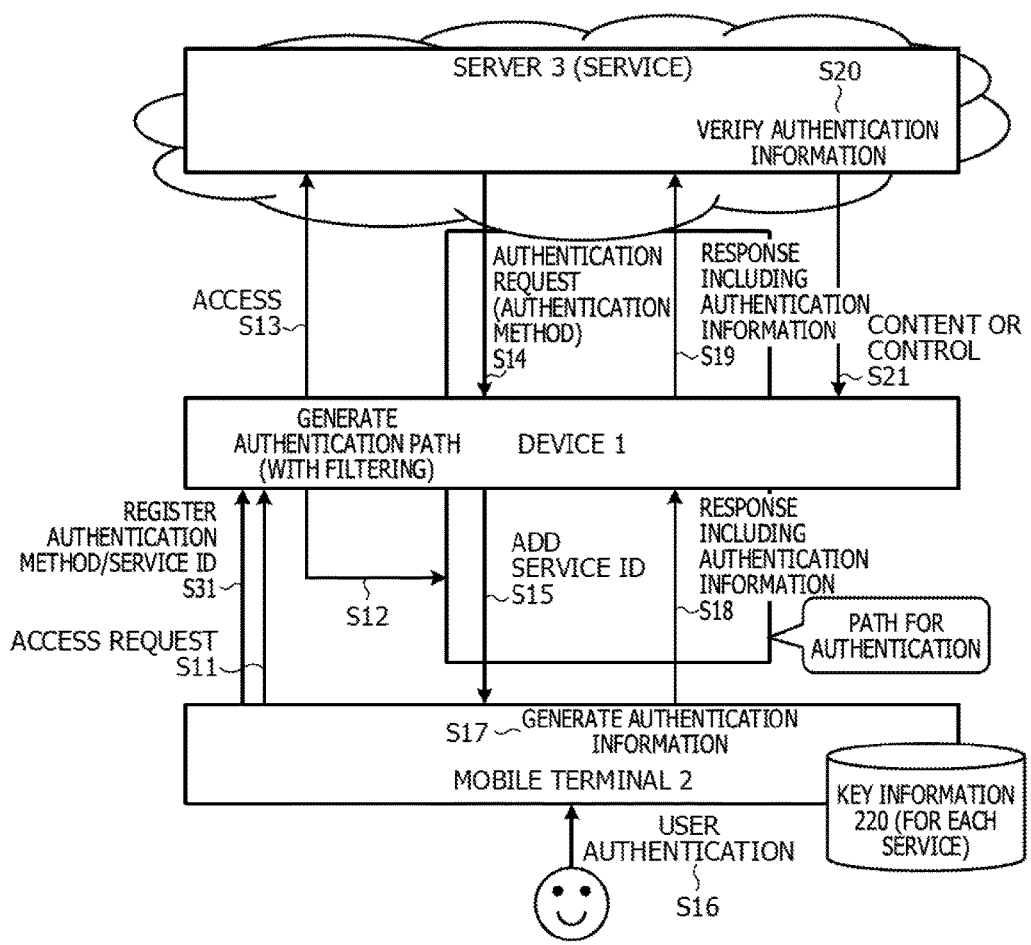
FIG. 6 is a diagram illustrating a modification of the flow of the information processing process according to the embodiment.

The case where the mobile terminal 2 registers a service for which an access request is to be made in the device 1 in advance before transmitting the access request for the service will be described with reference to FIG. 6. FIG. 6 is a diagram illustrating a modification of the flow of the image processing process according to the embodiment. Note that an operation that is the same or substantially the same as an operation in the flow of the information processing process illustrated in FIG. 3 is assigned the same reference sign so as to omit a repeated description of the operation. The flow of the information processing process illustrated in FIG. 6 differs from the flow of the information processing process illustrated in FIG. 3 in that S31 is added in FIG. 6.

As illustrated in FIG. 6, the service requesting unit 25 of the mobile terminal 2 requests the device 1 to register, in the device 1, one or more service IDs of services for which an access request is possibly to be made (S31). Then, the authentication path generating unit 13 of the device 1 generates the authentication path information 140 for each of the services for which an access request is possibly to be made and stores the generated authentication path information 140 in the storage unit 14.

For example, in the case where the service "View Map" is utilized by using an account of a user A and the service "Listen to Music" is utilized by using an account of a user B, the authentication path generating unit 13 registers the authentication path information 140 in advance in the following manner. Specifically, the authentication path generating unit 13 registers, in the authentication path information 140, the URL of the service "View Map" in association with the authentication URL of the mobile terminal 2 of the user A and the URL of the service "Listen to Music" in association with the authentication URL of the mobile terminal 2 of the user B.

Thereafter, the service requesting unit 25 of the mobile terminal 2 transmits an access request to the device 1 (S11). Then, the authentication path generating unit 13 of the device 1 acquires the authentication URL 143 that matches the URL of the source of the access request and the service URL 142 associated with the authentication URL 143 by using the authentication path information 140. The authentication path generating unit 13 then generates an authentication path between the mobile terminal 2 indicated by the authentication URL 143 and the server 3 corresponding to the service indicated by the service URL 142, the mobile terminal 2 and the server 3 being connected for authentication (S12). The service requesting unit 12 of the device 1 then accesses the server 3 by using the generated authentication path to make an access request to the service (S13). In this way, the device 1 successfully switches between the authentication destinations depending on the service to be accessed, by using the authentication path information 140 registered in advance.

The mobile terminal 2 registers one or more services for which an access request is possibly to be made in the device 1 in advance before transmitting the access request for the service; however, the configuration is not limited to this one. The mobile terminal 2 may register, in the device 1 in advance, a method to be used to perform authentication for each service for which an access request is possibly to be made before transmitting the access request for the service.

For example, the service requesting unit 25 of the mobile terminal 2 requests the device 1 to register services IDs of one or more services for which an access request is possibly to be made and methods to be used to perform authentication (S31). Then, the authentication path generating unit 13 of the device 1 generates the authentication path information 140 for each service for which an access request is possibly to be made and registers the generated authentication path information 140 in the storage unit 14 together with the authentication method. The authentication path information 140 used in this case may be stored such that the service name 141, the service URL 142, the authentication URL 143, and the authentication method are associated with one another. Examples of the authentication method include fingerprint authentication, iris authentication, and pattern authentication.

Thereafter, the service request receiving unit 33 of the server 3 receives an access request to a service. Then, the authentication request transmitting unit 34 transmits an authentication request including the authentication method used for the service to the device 1 as a response when making an authentication request for the service (S14). In response to receipt of the service authentication request for the service, the authentication path switching unit 15 of the device 1 acquires the authentication URL 143 and the authentication method that are associated with the service by using the authentication path information 140. If the acquired authentication method matches the authentication method included in the authentication request, the authentication path switching unit 15 switches the transfer destination of the authentication request to the acquired authentication URL 143 and transfers the authentication request having the service ID attached thereto to the mobile terminal 2 indicated by the authentication URL 143 (S15). On the other hand, if the acquired authentication method does not match the authentication method included in the authentication request, the authentication path switching unit 15 may transmit a response indicating that authentication is unsuccessful to the server 3 (S19). With such a configuration, the number of unnecessary transfer processes may be reduced by performing transfer to the mobile terminal 2 serving as the authentication destination, only when the authentication method that matches the registered authentication method is requested.

The mobile terminal 2 may further verify the validity of the device 1.

Figure 7:
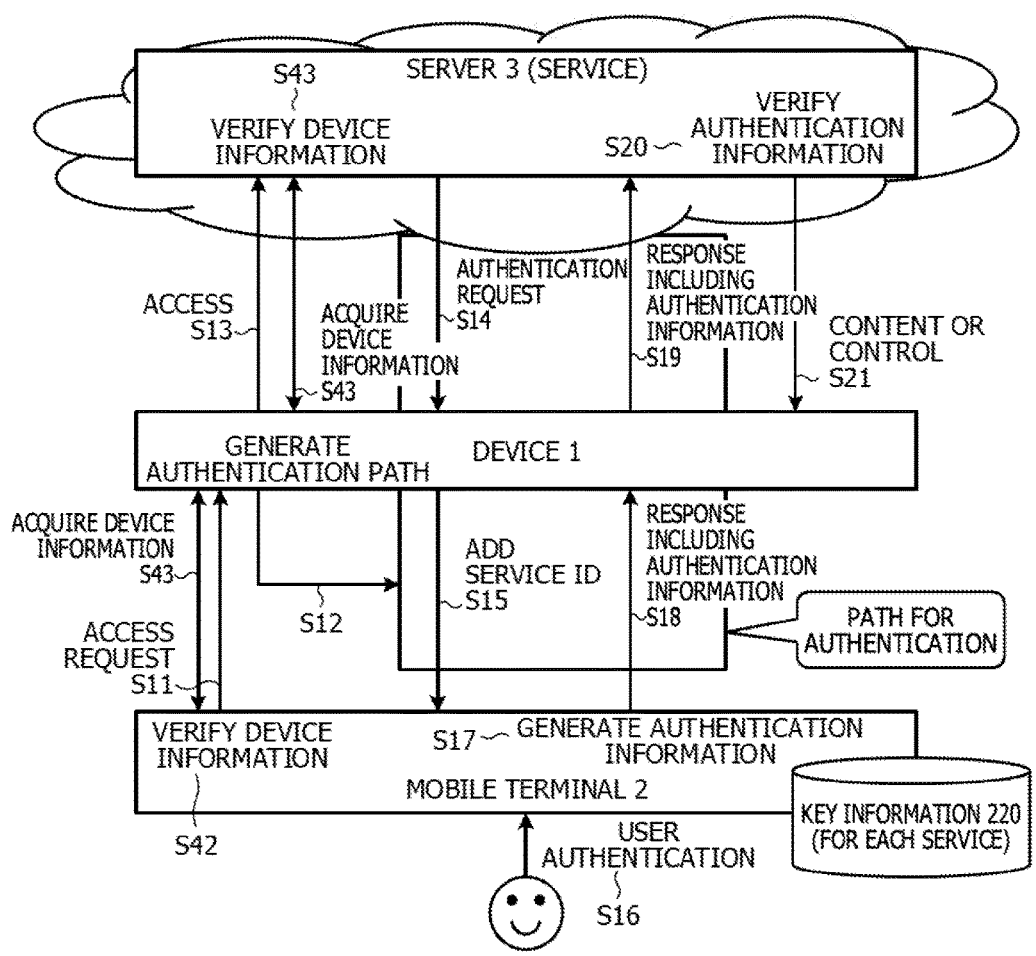
FIG. 7 is a diagram illustrating another modification of the flow of the information processing process according to the embodiment.

The case where the mobile terminal 2 performs verification of the validity of the device 1 will be described with reference to FIG. 7. FIG. 7 is a diagram illustrating another modification of the flow of the image processing process according to the embodiment. Note that an operation that is the same or substantially the same as an operation in the flow of the information processing process illustrated in FIG. 3 is assigned the same reference sign so as to omit a repeated description of the operation. The flow of the information processing process illustrated in FIG. 7 differs from the flow of the information processing process illustrated in FIG. 3 in that S41, S42, S43, and S44 are added in FIG. 7.

As illustrated in FIG. 7, the service requesting unit 25 of the mobile terminal 2 transmits a device information acquisition request to the device 1, and the service requesting unit 12 of the device 1 transmits device information of the device 1 to the mobile terminal 2 (S41). Then, the service requesting unit 25 of the mobile terminal 2 receives the device information of the device 1 and verifies whether the device information of the device 1 is valid (S42). Examples of the device information verification method include a method that uses a public key certificate as in Hypertext Transfer Protocol Secure (HTTPS) communication over the Web.

If the device information of the device 1 is valid, the service requesting unit 25 of the mobile terminal 2 may transmit an access request to the device 1 thereafter (S11). With this configuration, connection of the device 1 that is an unauthorized device to the server 3 is successfully avoided.

In addition, the server 3 may verify the validity of the device 1. As illustrated in FIG. 7, the service request receiving unit 33 of the server 3 that has received an access request for a service from the device 1 performs the following process. The service request receiving unit 33 transmits a device information acquisition request to the device 1, and the service requesting unit 12 of the device 1 transmits device information of the device 1 to the server 3 (S43). Then, the service request receiving unit 33 of the server 3 receives the device information of the device 1 and verifies whether the device information of the device 1 is valid (S44). Examples of the device information verification method include a method that uses a public key certificate as in HTTPS communication over the Web.

If the device information of the device 1 is valid, the authentication request transmitting unit 34 of the server 3 may transmit a authentication request for the service to the device 1 as a response thereafter (S14). With such a configuration, an access to the server 3 from the device 1 that is an unauthorized device is successfully avoided.

In the description, when verification of the authentication information of the user is successful, the content distributing unit 37 of the server 3 distributes content corresponding to the service to the device 1 as a response (S21). However, the configuration is not limited to this one, and the content distributing unit 37 of the server 3 may distribute content corresponding to the device 1 whose device information is successfully verified. That is, the content distributing unit 37 may change content to be distributed depending on the device 1.

Figure 8:
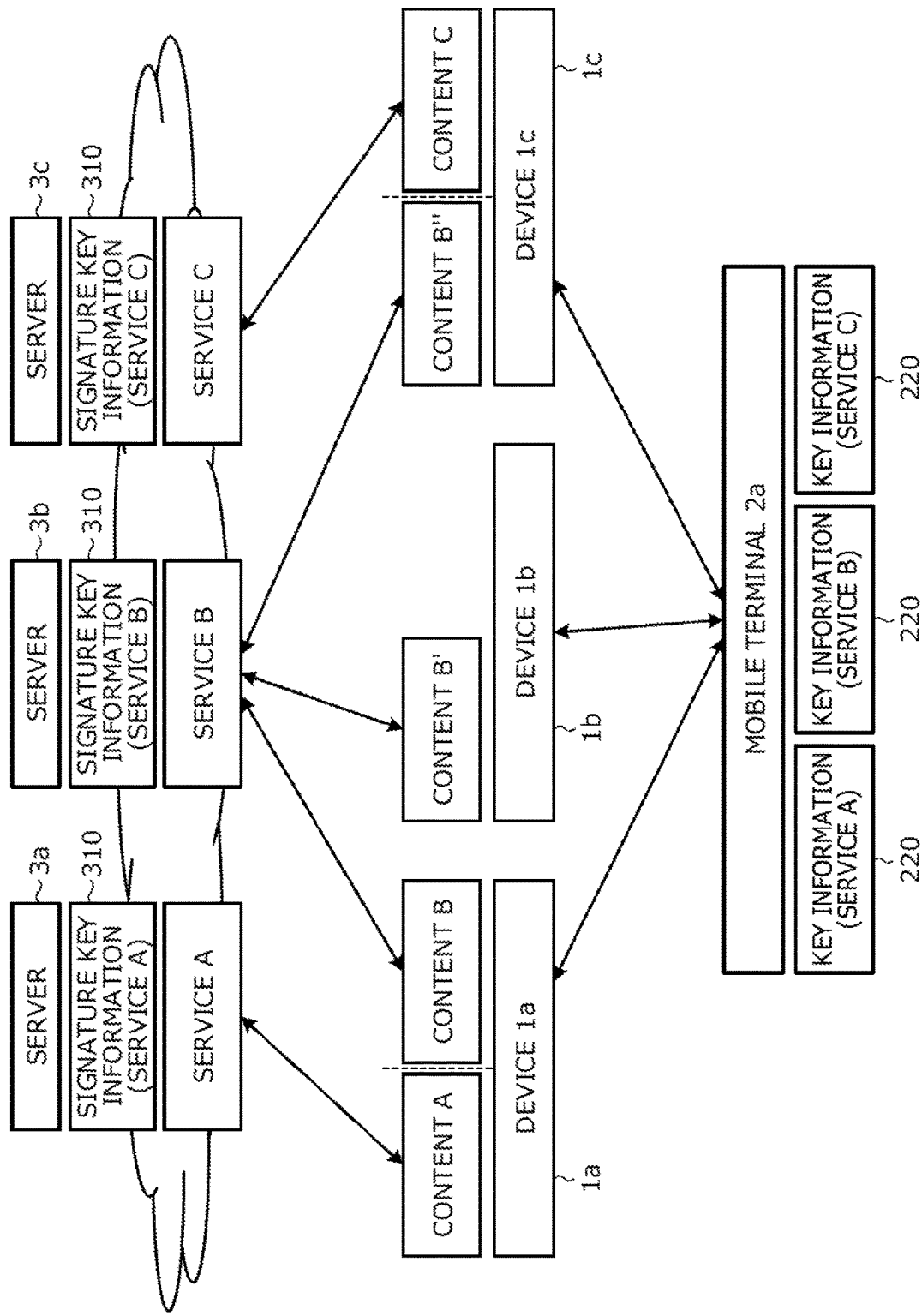
FIG. 8 is a diagram illustrating an application of the information processing system according to the embodiment.

FIG. 8 is a diagram illustrating an application of the information processing system according to the embodiment. It is assumed that a connected car, which is an automobile having an Internet communication function, is equipped with devices 1a, 1b, and 1c in FIG. 8. It is also assumed that a user carrying a mobile terminal 2a is in this connected car. The key information 220 for a service A, the key information 220 for a service B, and the key information 220 for a service C are registered in the mobile terminal 2a in advance. In addition, it is assumed that the service A is provided by a server 3a, the service B is provided by a server 3b, and the service C is provided by a server 3c. The signature key information 310 for the service A is registered in the server 3a in advance. The signature key information 310 for the service B is registered in the server 3b in advance. The signature key information 310 for the service C is registered in the server 3c in advance.

In such a circumstance, the mobile terminal 2a transmits an access request for the service A, an access request for the service B, and an access request for the service C to the devices 1a, 1b, and 1c. In this example, the device 1a receives the access requests for the services A and B from the mobile terminal 2a. The device 1b receives the access request for the service B from the mobile terminal 2a. The device 1c receives the access requests for the services B and C from the mobile terminal 2a.

The device 1a sets an authentication path between the mobile terminal 2a and the server 3a and accesses the server 3a by using the set authentication path to make an access request for the service A. The device 1a also sets an authentication path between the mobile terminal 2a and the server 3b and accesses the server 3b by using the set authentication path to make an access request for the service B.

The device 1b sets an authentication path between the mobile terminal 2a and the server 3b and accesses the server 3b by using the set authentication path to make an access request for the service B.

The device 1c sets an authentication path between the mobile terminal 2a and the server 3b and accesses the server 3b by using the set authentication path to make an access request for the service B. The device 1c also sets an authentication path between the mobile terminal 2a and the server 3c and accesses the server 3c by using the set authentication path to make an access request for the service C.

Then, in response to receipt of the access request for the service A from the device 1a, the server 3a transmits an authentication request for the service A to the device 1a as a response.

In response to receipt of the access request for the service B from the device 1a, the server 3b transmits an authentication request for the service B to the device 1a as a response. In response to receipt of the access request for the service B from the device 1b, the server 3b transmits an authentication request for the service B to the device 1b. In response to receipt of the access request for the service B from the device 1c, the server 3b transmits an authentication request for the service B to the device 1c.

In response to receipt of the access request for the service C from the device 1c, the server 3c transmits an authentication request for the service C to the device 1c.

Then, in response to receipt of the authentication request for the service A, the device 1a switches the transfer destination of the authentication request to the mobile terminal 2a by using the authentication path information 140, attaches the service ID of the service A to the authentication request for the service A, and transfers the resultant authentication request to the mobile terminal 2a. In addition, in response to receipt of the authentication request for the service B, the device 1a switches the transfer destination of the authentication request to the mobile terminal 2a by using the authentication path information 140, attaches the service ID of the service B to the authentication request for the service B, and transfers the resultant authentication request to the mobile terminal 2a.

In response to receipt of the authentication request for the service B, the device 1b switches the transfer destination of the authentication request to the mobile terminal 2a by using the authentication path information 140, attaches the service ID of the service B to the authentication request for the service B, and transfers the resultant authentication request to the mobile terminal 2a.

In response to receipt of the authentication request for the service B, the device 1c switches the transfer destination of the authentication request to the mobile terminal 2a by using the authentication path information 140, attaches the service ID of the service B to the authentication request for the service B, and transfers the resultant authentication request to the mobile terminal 2a. In response to receipt of the authentication request for the service C, the device 1c switches the transfer destination of the authentication request to the mobile terminal 2a by using the authentication path information 140, attaches the service ID of the service C to the authentication request for the service C, and transfers the resultant authentication request to the mobile terminal 2a.

Then, in response to receipt of the authentication request for the service A from the device 1a, the mobile terminal 2a displays the authentication request for the service A in the authentication screen. In response to receipt of the authentication request for the service B from the device 1a, the mobile terminal 2a then displays the authentication request for the service B in the same authentication screen. Then, if user authentication is successful, the mobile terminal 2a generates authentication information of the user for the service A by using the key information 220 for the service A and generates authentication information of the user for the service B by using the key information 220 for the service B. Then, the mobile terminal 2a transmits the authentication information for the user for the service A to the device 1a as a response for the authentication request for the service A. The mobile terminal 2a also transmits the authentication information of the user for the service B to the device 1a as a response for the authentication request for the service B.

In response to receipt of the authentication request for the service B from the device 1b, the mobile terminal 2a displays the authentication request for the service B in the authentication screen. Then, if user authentication is successful, the mobile terminal 2a generates authentication information of the user by using the key information 220 for the service B and transmits the authentication information of the user for the service B to the device 1b as a response for the authentication request for the service B.

In response to receipt of the authentication request for the service B from the device 1c, the mobile terminal 2a displays the authentication request for the service B in the authentication screen. Then, in response to receipt of the authentication request for the service C from the device 1c, the mobile terminal 2a displays the authentication request for the service C in the same authentication screen. Then, if user authentication is successful, the mobile terminal 2a generates authentication information of the user for the service B by using the key information 220 for the service B and generates authentication information of the user for the service C by using the key information 220 for the service C. Then, the mobile terminal 2a transmits the authentication information of the user for the service B to the device 1c as a response for the authentication request for the service B. The mobile terminal 2a also transmits the authentication information of the user for the service C to the device 1c as a response for the authentication request for the service C.

Then, the device 1a switches the transfer destination of the response for the authentication request for the service A to the service A by using the authentication path information 140 and transfers the authentication information of the user to the server 3a corresponding to the service A as a response for the authentication request for the service A. In addition, the device 1a switches the transfer destination of the response for the authentication request for the service B to the service B by using the authentication path information 140 and transfers the authentication information of the user to the server 3b corresponding to the service B as a response for the authentication request for the service B.

The device 1b switches the transfer destination of the response for the authentication request for the service B to the service B by using the authentication path information 140 and transfers the authentication information of the user to the server 3b corresponding to the service B as a response for the authentication request for the service B.

The device 1c switches the transfer destination of the response for the authentication request for the service B to the service B by using the authentication path information 140 and transfers the authentication information of the user to the server 3b corresponding to the service B as a response for the authentication request for the service B. In addition, the device 1c switches the transfer destination of the response for the authentication request for the service C to the service C by using the authentication path information 140 and transfers the authentication information of the user to the server 3c corresponding to the service C as a response for the authentication request for the service C.

Then, the server 3a verifies the authentication information of the user for the service A. If verification of the authentication information is successful, the server 3a distributes content A corresponding to the service A to the device 1a as a response.

The server 3b verifies the authentication information of the user for the service B. If verification of the authentication information is successful, the server 3b distributes content B corresponding to the service B to the device 1a as a response. In addition, the server 3b verifies the authentication information of the user for the service B. If verification of the authentication information is successful, the server 3b distributes content B' corresponding to the service B to the device 1b as a response. In addition, the server 3b verifies the authentication information of the user for the service B. If verification of the authentication information is successful, the server 3b distributes content B" corresponding to the service B to the device 1c as a response.

The server 3c verifies the authentication information of the user for the service C. If verification of the authentication information is successful, the server 3c distributes content C corresponding to the service C to the device 1c as a response.

The mobile terminal 2a performs user authentication collectively for authentication requests from the plurality of services A and B that are being processed by the device 1a. The mobile terminal 2a also performs user authentication collectively for the authentication requests from the plurality of services B and C that are being processed by the device 1c. However, the configuration is not limited to this one. In the case where the services A, B, and C are simultaneously utilized, the mobile terminal 2a may perform user authentication collectively for the plurality of services instead of performing user authentication on a device-by-device basis.

The authentication information receiving unit 35 of the server 3 receives a response including authentication information for the service from the device 1. An expiration date may be set for the authentication information for the service transferred from the device 1. In such a case, the authentication unit 36 of the server 3 verifies the authentication information for the service if the expiration date attached to the authentication information for the services has not been reached. If the authentication unit 36 determines that the expiration date attached to the authentication information for the service has been reached, the authentication request transmitting unit 34 may transmit an authentication request for the service to the device 1 again. The expiration date of the authentication information may be set by the device 1 or by the mobile terminal 2. In addition, the server 3 may store the expiration date of the authentication information. In this case, the server 3 takes the expiration date into consideration when performing authentication for the service, and thus the security of the authentication is successfully improved.

In addition, the authentication information receiving unit 35 of the server 3 receives a response including authentication information for a service from the device 1. An access right for accessing data may be attached to the authentication information for the service transferred from the device 1. In such a case, the authentication unit 36 determines data to be distributed to the device 1 in accordance with the access right for accessing the data that is attached to the authentication information for the service. With this configuration, the server 3 successfully limits data to be distributed to the device 1. That is, the server 3 successfully avoids the situation where private information is supplied to the device 1, in accordance with the access right for accessing data.

In addition, the device 1 may delete authentication information stored in the device 1 and content of the service received by the device 1, in response to disconnection of communication with the mobile terminal 2. In addition, in the case where the expiration date is attached to authentication information for a service, the device 1 may delete authentication information stored in the device 1 and content of the service received by the device 1 in accordance with the expiration date of authentication. In such a case, since the device 1 deletes authentication information stored therein, a potential misuse and leakage of the authentication information after disconnection of communication with the mobile terminal 2 is successfully avoided. In addition, since the device 1 deletes content of a service stored therein, a situation where private information is left as information included the content of the service is successfully avoided.

In the embodiment above, the device 1 sets, in the storage unit 14, a communication path for authentication between the mobile terminal 2 and the server 3 that provides a service, in response to an access request for the service from the mobile terminal 2. The device 1 transmits the access request for the service to the server 3 by using the communication path for authentication. In response to an authentication request from the server 3, the device 1 transfers the authentication request to the mobile terminal 2 by using the communication path for authentication. In response to a response including authentication information from the mobile terminal 2, the device 1 transfers the response including the authentication information to the server 3 by using the communication path for authentication. The device 1 receives the service provided by the server 3. Such a configuration allows the device 1 to implement secure utilization of a service involving user authentication without having an authentication function. In addition, user authentication may be implemented at low cost for a service involving user authentication, as a result of the device 1 causing the mobile terminal 2 and the server 3 to perform an authentication function without having an authentication function and without modifying the mobile terminal 2 and the server 3.

In addition, in the embodiment above, in response to receipt of a certain request from the server 3, the device 1 identifies the certain request to be an authentication request in accordance with content set in the certain request and transfers the authentication request to the mobile terminal 2 by using the communication path for authentication. With such a configuration, the device 1 may cause the mobile terminal 2 to process the authentication request by using the communication path for authentication by identifying a request from the server 3 to be an authentication request by using the content set in the request.

In addition, in the embodiment above, the device 1 transfers a response for an authentication request, which includes an expiration date of authentication and a data access right, to the server 3. With such a configuration, the server 3 may improve the security of authentication by taking into account the expiration date of authentication for the service. The server 3 may also limit data to be distributed to the device 1 by distributing data to the device 1 in accordance with the data access right.

In addition, in the embodiment above, in response to receipt of access requests for a plurality of services from the mobile terminal 2, the device 1 sets, for each of the services for which the access requests have been made, a communication path for authentication in the storage unit 14. The device 1 performs service accessing processes in parallel for the respective services for which the access requests have been made. With such a configuration, the device 1 successfully performs a service accessing process at high speed by performing the service accessing processes in parallel for the respective services for which the access requests have been made. In addition, the device 1 may cause the mobile terminal 2 to perform authentication collectively for the plurality of services instead of performing authentication on a service-by-service basis, by continuously transferring authentication requests for the respective services to the mobile terminal 2.

In addition, in the embodiment above, the device 1 deletes authentication information stored therein and data of a service received thereby in response to disconnection of communication with the mobile terminal 2. With such a configuration, since the device 1 deletes authentication information stored therein in response to disconnection of communication with the mobile terminal 2, a potential misuse and leakage of authentication information after disconnection of communication with the mobile terminal 2 is successfully avoided. In addition, since the device 1 deletes data of the service stored therein in response to disconnection of communication with the mobile terminal 2, a situation where private information is left as information included in the data of the service is successfully avoided.

In addition, in the embodiment above, the device deletes authentication information stored therein and data of a service received thereby in accordance with an expiration date of authentication. With such a configuration, since the device 1 deletes authentication information stored therein upon expiration of the authentication, a potential misuse and leakage of the authentication information after expiration of the authentication is successfully avoided. In addition, since the device 1 deletes data of a service stored therein upon expiration of the authentication, a situation where private information is left as information included in the data of the service is successfully avoided.

In addition, in the embodiment above, the device 1 sets, in the storage unit 14, a communication path for authentication, in which an address of a service for which access is requested with the access request and an address of the mobile terminal 2 that transmits the access request are associated with each other. With such a configuration, the device 1 successfully causes the server 3 and the mobile terminal 2 to perform a process of accessing the desired service by using the communication path for authentication.

Note that components of the apparatuses illustrated in the drawings are not necessarily physically configured as illustrated. That is, specific embodiments regarding distribution and integration of the apparatuses are not limited to the illustrated ones, and all or part of the apparatuses may be configured to be functionally or physically distributed or integrated in a given unit in accordance with various load and usage states. For example, the authentication path generating unit 13 and the authentication path switching unit 15 may be integrated. In addition, the network interface unit 10 and the network interface unit 11 may be integrated. In addition, the storage unit 14 may be connected to the device 1 via a network as an external device. The storage unit 22 may be connected to the mobile terminal 2 via a network as an external device. The storage unit 31 may be connected to the server 3 via a network as an external device.

Figure 9:
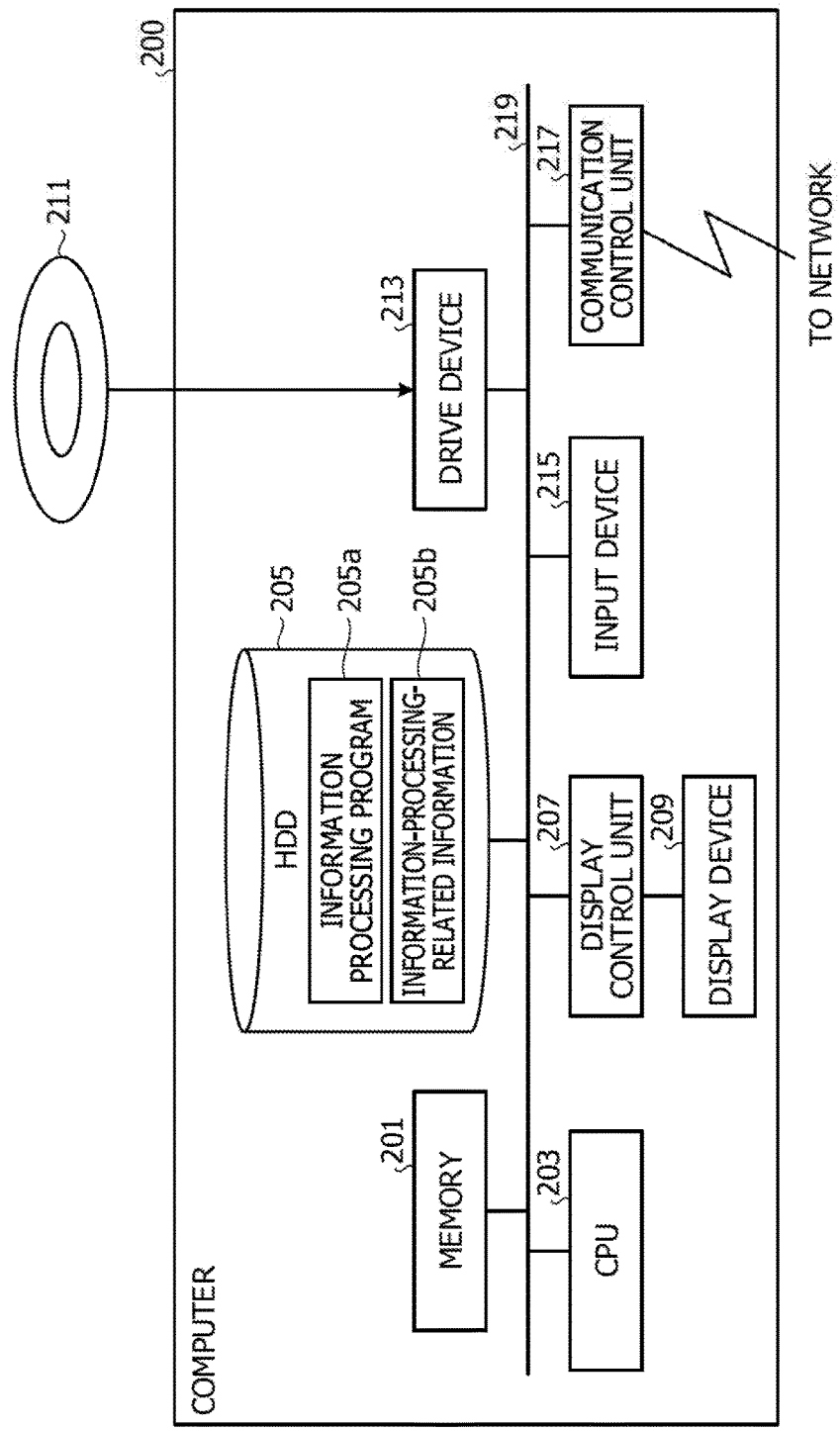
FIG. 9 is a diagram illustrating an example of a computer that executes an information processing program.

In addition, various processes described in the embodiment can be implemented as a result of a computer, such as a personal computer or a workstation, executing a program prepared in advance. An example of a computer that executes an information processing program that implements functions substantially the same as the functions of the device 1 illustrated in FIG. 1 will be described below. FIG. 9 is a diagram illustrating an example of a computer that executes the information processing program.

As illustrated in FIG. 9, a computer 200 includes a central processing unit (CPU) 203 that performs various arithmetic processes, an input device 215 that accepts input of data from a user, and a display control unit 207 that controls a display device 209. The computer 200 also includes a drive device 213 that reads a program from a storage medium and a communication control unit 217 that exchanges data with other computers via a network. The computer 200 also includes a memory 201 that temporarily stores various kinds of information and a hard disk drive (HDD) 205. The memory 201, the CPU 203, the HDD 205, the display control unit 207, the drive device 213, the input device 215, and the communication control unit 217 are connected to one another via a bus 219.

The drive device 213 is a device for a removable disc 211, for example.

The CPU 203 reads and loads an information processing program 205a into the memory 201 and executes the information processing program 205a as processes. Such processes correspond to the respective functional units of the device 1. Information-processing-related information 205b corresponds to the service requesting unit 12, the authentication path generating unit 13, the authentication path switching unit 15, and the content receiving unit 16 of the device 1. Various kinds of information, such as the information processing program 205a, are stored on the removable disc 211, for example.

Note that the information processing program 205a is not necessarily stored in the HDD 205 initially. For example, the information processing program 205a may be stored on a "portable physical medium" that is inserted into the computer 200, for example, a flexible disk (FD), a Compact Disc-Read Only Memory (CD-ROM), a Digital Versatile Disc (DVD), a magneto-optical disk, or an integrated circuit (IC) card. The computer 200 may read the information processing program 205a from the "portable physical medium" and execute the information processing program 205a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to execute a receiving process that includes receiving a first service access request from a first apparatus, the first service access request including first information, the first information indicating an access destination, execute a setting process that includes storing, in the memory, second information concerning a communication path for authentication between the first apparatus and a second apparatus, in response to the first service access request from the first apparatus, the second apparatus being an apparatus which is indicated as the access destination by the first information included in the received first service access request, execute a transmission process that includes transmitting a second service access request to the second apparatus by using the second information and the received first service access request, execute a first transfer process that includes transferring, in response to an authentication request from the second apparatus, the authentication request to the first apparatus by using the second information, execute a second transfer process that includes transferring, in response to a response including authentication information from the first apparatus, the response including the authentication information to the second apparatus by using the second information, and execute a reception process that includes receiving data of a service after the transferring the response to the second apparatus, and outputting a content based on the received data.

2. The information processing apparatus according to claim 1, wherein
the first transfer process includes
identifying, in response to receipt of a certain request from the second apparatus, the certain request to be the authentication request in accordance with values set in the certain request, and
transferring the authentication request to the first apparatus by using the information concerning the communication path for authentication.

3. The information processing apparatus according to claim 1, wherein
the second transfer process includes transferring a response for the authentication request to the second apparatus, the response including an expiration date of authentication or a data access right.

4. The information processing apparatus according to claim 1, wherein
the setting process includes storing, in the memory, in response to receipt of service access requests for a plurality of services from the first apparatus, information concerning a communication path for authentication for each of the plurality of services for which the service access requests have been received, and
the processor is configured to execute the transmission processes in parallel for the plurality of services for which the service access requests have been received and execute the first transfer processes in parallel for the plurality of services for which the service access requests have been received.

5. The information processing apparatus according to claim 1, wherein
the processor is further configured to execute a deletion process that includes deleting, in response to disconnection of communication with the first apparatus, the authentication information from the information processing apparatus and the data of the service received by the reception process.

6. The information processing apparatus according to claim 3, wherein
the processor is further configured to execute a deletion process that includes deleting the authentication information from the information processing apparatus and the data of the service received by the reception process in accordance with the expiration date of authentication.

7. The information processing apparatus according to claim 1, wherein
the setting process includes storing the information concerning the communication path for authentication in the memory, the information associating with each other an address of a service for which access is requested with the service access request and an address of the first apparatus that transmits the service access request.

8. A non-transitory computer-readable storage medium for storing a program that causes a computer to execute a process, the process comprising:
executing a receiving process that includes receiving a first service access request from a first apparatus, the first service access request including first information, the first information indicating an access destination;
executing a setting process that includes storing, in the memory, second information concerning a communication path for authentication between the first apparatus and a second apparatus that provides a service, in response to the service access request from the first apparatus, the second apparatus being an apparatus which is indicated as the access destination by the first information included in the received first service access request;
executing a transmission process that includes transmitting a second service access request to the second apparatus by using the second information and the received first service access request;
executing a first transfer process that includes transferring, in response to an authentication request from the second apparatus, the authentication request to the first apparatus by using the second information;
executing a second transfer process that includes transferring, in response to a response including authentication information from the first apparatus, the response including the authentication information to the second apparatus by using the second information; and
executing a reception process that includes receiving data of a service after the transferring the response to the second apparatus, and outputting a content based on the received data.

9. An information processing method performed by a computer, the method comprising:
executing, by a processor of the computer, a receiving process that includes receiving a first service access request from a first apparatus, the first service access request including first information, the first information indicating an access destination;
executing, by the processor of the computer, a setting process that includes storing, in a memory of the computer, second information concerning a communication path for authentication between the first apparatus and a second apparatus that provides a service, in response to the service access request from the first apparatus, the second apparatus being an apparatus which is indicated as the access destination by the first information included in the received first service access request;

executing, by the processor of the computer, a transmission process that includes transmitting a second service access request to the second apparatus by using the second information and the received first service access request;

executing, by the processor of the computer, a first transfer process that includes transferring, in response to an authentication request from the second apparatus, the authentication request to the first apparatus by using the second information;

executing, by the processor of the computer, a second transfer process that includes transferring, in response to a response including authentication information from the first apparatus, the response including the authentication information to the second apparatus by using the second information; and executing, by the processor of the computer, a reception process that includes receiving data of a service after the transferring the response to the second apparatus, and outputting a content based on the received data.

* * * * *